US008644834B2

(12) United States Patent
Ahluwalia

(10) Patent No.: US 8,644,834 B2
(45) Date of Patent: Feb. 4, 2014

(54) RESOURCE ALLOCATION

(75) Inventor: Jagdeep Singh Ahluwalia, Sutton (GB)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 12/734,370

(22) PCT Filed: Oct. 27, 2008

(86) PCT No.: PCT/JP2008/069836
§ 371 (c)(1),
(2), (4) Date: Apr. 28, 2010

(87) PCT Pub. No.: WO2009/057732
PCT Pub. Date: May 7, 2009

(65) Prior Publication Data
US 2010/0240375 A1 Sep. 23, 2010

(30) Foreign Application Priority Data
Oct. 29, 2007 (GB) .................................. 0721148.5

(51) Int. Cl.
*H04W 36/00* (2009.01)
(52) U.S. Cl.
USPC ........ 455/439; 455/452.1; 455/438; 370/331; 370/329; 370/332
(58) Field of Classification Search
USPC ........ 455/450, 436, 456.1, 452.1, 453, 452.2, 455/62, 560, 447, 524, 438, 439; 370/329, 370/468, 331, 330, 337, 332; 375/132, 133, 375/299, 135, E1.035
See application file for complete search history.

(56) References Cited

U.S. PATENT DOCUMENTS

| 6,243,582 | B1 | | 6/2001 | Lahtinen |
|---|---|---|---|---|
| 6,363,252 | B1 | * | 3/2002 | Hamalainen et al. ......... 455/436 |
| 2004/0162072 | A1 | * | 8/2004 | Sigle et al. .................... 455/436 |
| 2004/0166841 | A1 | | 8/2004 | Parmar et al. |
| 2005/0047354 | A1 | * | 3/2005 | Zeira et al. .................... 370/280 |
| 2005/0096089 | A1 | * | 5/2005 | Ishii et al. ..................... 455/561 |
| 2007/0047493 | A1 | | 3/2007 | Park et al. |
| 2007/0189205 | A1 | | 8/2007 | Terry et al. |
| 2007/0237103 | A1 | * | 10/2007 | Reynolds et al. .......... 370/310.2 |
| 2008/0227454 | A1 | * | 9/2008 | Damnjanovic ................ 455/436 |
| 2008/0254800 | A1 | | 10/2008 | Chun et al. |
| 2009/0086676 | A1 | * | 4/2009 | Meylan et al. ................ 370/331 |
| 2009/0135766 | A1 | * | 5/2009 | Vitebsky et al. .............. 370/329 |
| 2010/0317344 | A1 | * | 12/2010 | Dalsgaard et al. ............ 455/436 |

FOREIGN PATENT DOCUMENTS

| CN | 1859791 A | 11/2006 |
|---|---|---|
| CN | 1933444 A | 3/2007 |
| EP | 1806941 B1 | 7/2007 |

(Continued)

OTHER PUBLICATIONS

Japanese Office Action dated Aug. 8, 2012 with a partial English translation.
NEC: 3GPP Ts 36.300 V8.2.0, R2-074998, "Signaling Allocated Resource Persistantly Scheduled Bearers", Nov. 5-9, 2007, Korea, Jeju, pp. 1-5.
IPWireless, 3GPP TSG RAN WG2 #57, R2-070646, "Contention-Free Intra-LTE Handover", Feb. 12-16, 2007, St. Louis Missouri, USA, pp. 1-4.

(Continued)

*Primary Examiner* — Mahendra Patel
(74) *Attorney, Agent, or Firm* — McGinn Intellectual Property Law Group, PLLC

(57) ABSTRACT

A system is proposed to provide handover in a mobile telecommunications environment, particularly applicable to 3GPP networks, in which a user device, such as a mobile telephone, receives signalling for persistently allocated resources generated by a target base station via a source base station.

42 Claims, 5 Drawing Sheets

(56) References Cited

FOREIGN PATENT DOCUMENTS

| | | |
|---|---|---|
| JP | 5-284562 A | 10/1993 |
| JP | 6-303662 A | 10/1994 |
| JP | 2004-304298 A | 10/2004 |
| JP | 2008-547353(A) | 12/2008 |
| JP | 2009-510887(A) | 3/2009 |
| JP | 2009-513086(A) | 3/2009 |
| WO | WO 97/23110 | 6/1997 |
| WO | WO 01/74095 A2 | 10/2001 |
| WO | WO 2006/103547 A1 | 10/2006 |
| WO | WO2007/007990 A1 | 1/2007 |
| WO | WO 2007/052922 A1 | 5/2007 |
| WO | WO 2007/066882 A1 | 6/2007 |

OTHER PUBLICATIONS

3GPP TS 36.300 V8.2.0 (Sep. 2007) $3^{rd}$ Generation Partnership Project; Technical Specification Group Radio Access Network; Evolved Universal Terrestrial Radio Access (E-Ultra) and Evolved Universal Terrestrial Radio Access Network (E-UTRAN); Overall Description; Stage 2 (Release 8).
Japanese Office Action dated Nov. 7, 2012, with English translation.
3GPP TS 36.300 V8.2.0., Oct. 5, 2007, pp. 38-43.
Chinese Office Action dated Oct. 9, 2012, with English translation.
NEC: 3GPP TSG-RAN WG2#60, R2-075001, "Information in RRC Messages for Persistantly Scheduled Bearers," Nov. 5-9, 2007, Korea, Jeju.
NEC: 3GPP TSG-RAN WG2#57, Tdoc R2-0750656, "Resource allocations in target cell after Handover," Feb. 12-16, 2007, p. 1-4.
3GPP TS 36.300 V8.2.0, 3GPP, Oct. 5, 2007, pp. 19, 21, 22.

* cited by examiner

RESOURCE ALLOCATION

TECHNICAL FIELD

The present invention relates to the allocation of resources in a communications system when a communications node changes association from a source base station to a target base station. The invention has particular although not exclusive relevance to persistently allocated resources in the Long Term Evolution (LTE) of UTRAN (called Evolved Universal Terrestrial Radio Access Network (E-UTRAN)).

BACKGROUND ART

In mobile telecommunications networks, there is a requirement for User Equipment (UE) to handover from one base station to another. The signalling sequence for the intra-LTE handover procedure has been described in 3GPP specification TS 36.300, the content of which is incorporated herein by reference. However, the specifics on resource allocations in the target cell have not yet been addressed in detail. The various acronyms applicable to 3 G communications will of course be familiar to those skilled in the art but a glossary is appended at the end of the description for the benefit of lay readers.

Although for efficiency of understanding for those of skill in the art the invention will be described in detail in the context of a 3G system, the principles of the handover procedure can be applied to other systems, e.g. other CDMA or wireless systems in which a mobile device or User Equipment (UE) communicates with one of several other devices (corresponding to eNodeB) and/or with the corresponding elements of the system changed as required.

DISCLOSURE OF THE INVENTION

According to one aspect, the present invention seeks to provide a method performed in a target communications device, the method comprising: receiving a handover command from a source communications device indicating handover of a user communications device from the source communications device to the target communications device; determining required resources to be persistently allocated for communication with the user communications device; and preparing a handover request acknowledgment including allocation data identifying resources to be persistently allocated for the user communications device; and sending the handover request acknowledgment to the source communications device. The target communications device then uses the persistently allocated resources to communicate with the user device.

In one embodiment the allocation data is provided within a transparent container that is included within the handover request acknowledgment. The allocation data may comprise data identifying the resource blocks to use for communications and data indicating a start time from which the allocated resources are to be used. The data indicating a start time may comprises a system frame number. The allocation data may also comprise data indicating an interval between successive times that the allocated resources are to be used.

In a preferred embodiment, the allocation data comprises: i) uplink allocation data defining resources to be used by the user communications device to transmit data to the target communications device as well as other uplink specific data; ii) downlink allocation data defining resources to be used by the user communications device to receive data from the target communications device as well as other downlink specific data; and iii) common data relating to information that is common for uplink and downlink communications, such as data indicating a start time from which the allocated resources can be used, and/or data indicating an interval between successive times that the allocated resources are to be used.

The invention also provides a method performed in a source communications device, the method comprising: transmitting a handover command to a target communications device indicating handover of a user communications device from the source communications device to the target communications device; receiving, from the target communications device, a handover request acknowledgment including allocation data identifying resources to be persistently allocated for the user communications device to communicate with the target communications device; preparing a handover command including said allocation data identifying said persistently allocated resources; and sending the handover command to the user communications device.

The invention also provides a method performed in a user communications device, the method comprising: communicating with a source communications device using first persistently allocated resources; receiving a handover command from the source communications device, the handover command instructing the user communications device to handover to a target communications device and including second persistently allocated resources allocated by the target communications device; and processing the received handover command to determine the persistently allocated resources to be used to communicate with said target communications device.

According to another aspect, the invention also provides a method of signalling persistently allocated resources in a communications system, the method comprising: generating uplink allocation data defining resources for use in communicating data in an uplink between a user device and a data, the downlink allocation data and the common allocation data from the communications device to the user device. The signalling step can signal the uplink allocation data, the downlink allocation data and the common allocation data at the same time or in a single container. The common allocation data may defines times at which said resources are to be used for said uplink and said downlink communications.

BRIEF DESCRIPTION OF THE DRAWINGS

These and other features and aspects of the invention will become apparent from the following exemplary embodiments which are described with reference to the accompanying drawings in which.

BEST MODE FOR CARRYING OUT THE INVENTION

Overview

Figure 1:
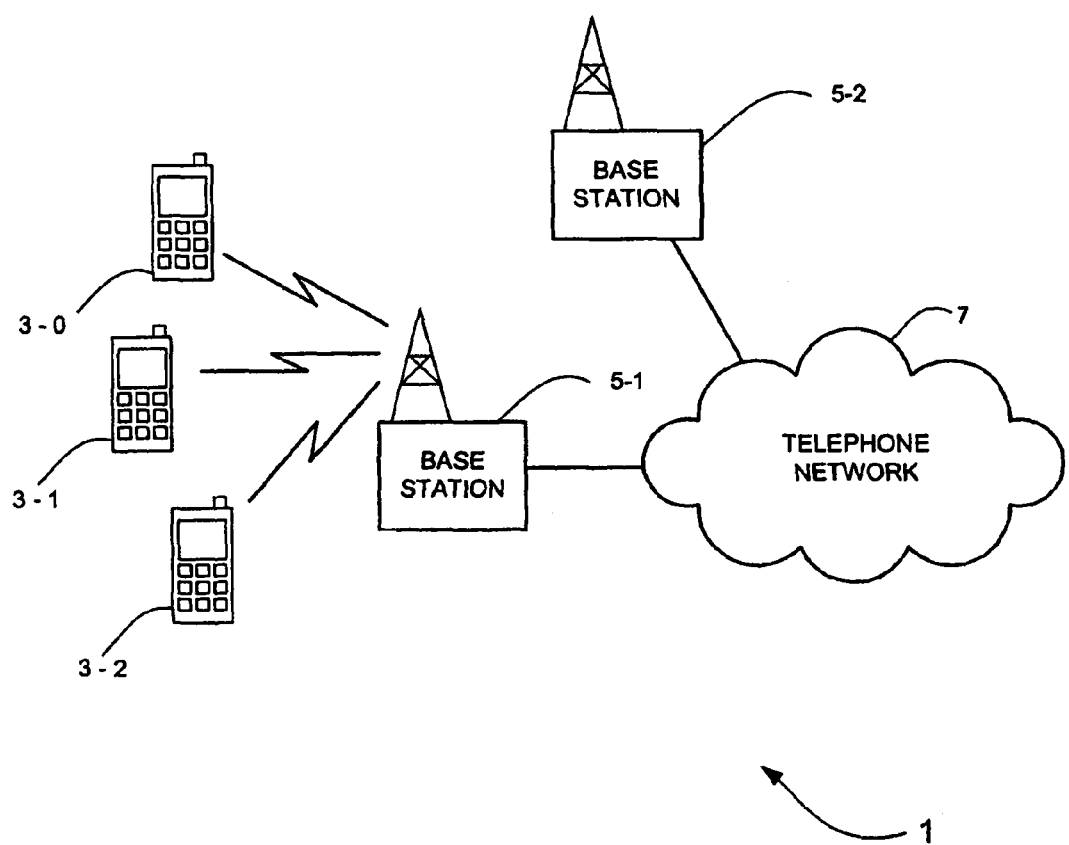
FIG. 1 schematically illustrates a mobile telecommunication system of a type to which the embodiment is applicable.

FIG. 1 schematically illustrates a mobile (cellular) telecommunications system 1 in which users of mobile telephones (MT) 3-0, 3-1, and 3-2 can communicate with other users (not shown) via one of the base stations 5-1 or 5-2 and a telephone network 7. In this embodiment, for the downlink (DL), the base stations 5 use an orthogonal frequency division multiple access (OFDMA) technique to transmit data to the mobile telephones 3; and, for the uplink (UL), the mobile telephones 3 use a single carrier frequency division multiple access (FDMA) technique to transmit data to the base stations 5. A number of uplink and downlink communications resources (sub-carriers, time slots etc) are available for the wireless link between the mobile telephones 3 and the base stations 5. In this embodiment, the base stations 5 allocate downlink resources to each mobile telephone 3 depending on the amount of data to be sent to the mobile telephone 3. Similarly, the base stations 5 allocate uplink resources to each mobile telephone 3 depending on the amount and type of data the mobile telephone 3 has to send to the base station 5. When a mobile telephone 3 moves from the cell of a source base station (e.g. base station 5-1) to a target base station (e.g. base station 5-2), a handover (HO) procedure (protocol) is carried out in the source and target base stations 5 and in the mobile telephone 3, to control the handover process.

Time/Frequency Resources

In this embodiment, the available transmission band is divided into a number of sub-bands, each of which comprises a number of contiguous sub-carriers arranged in contiguous blocks. In order to avoid interference between the sub-carriers of adjacent sub-bands, guard bands are provided at the end of each sub-band. Different mobile telephones 3 are allocated different resource block(s) (sub-carriers) within a sub-band at different times for transmitting/receiving their data.

Base Station

Figure 2:
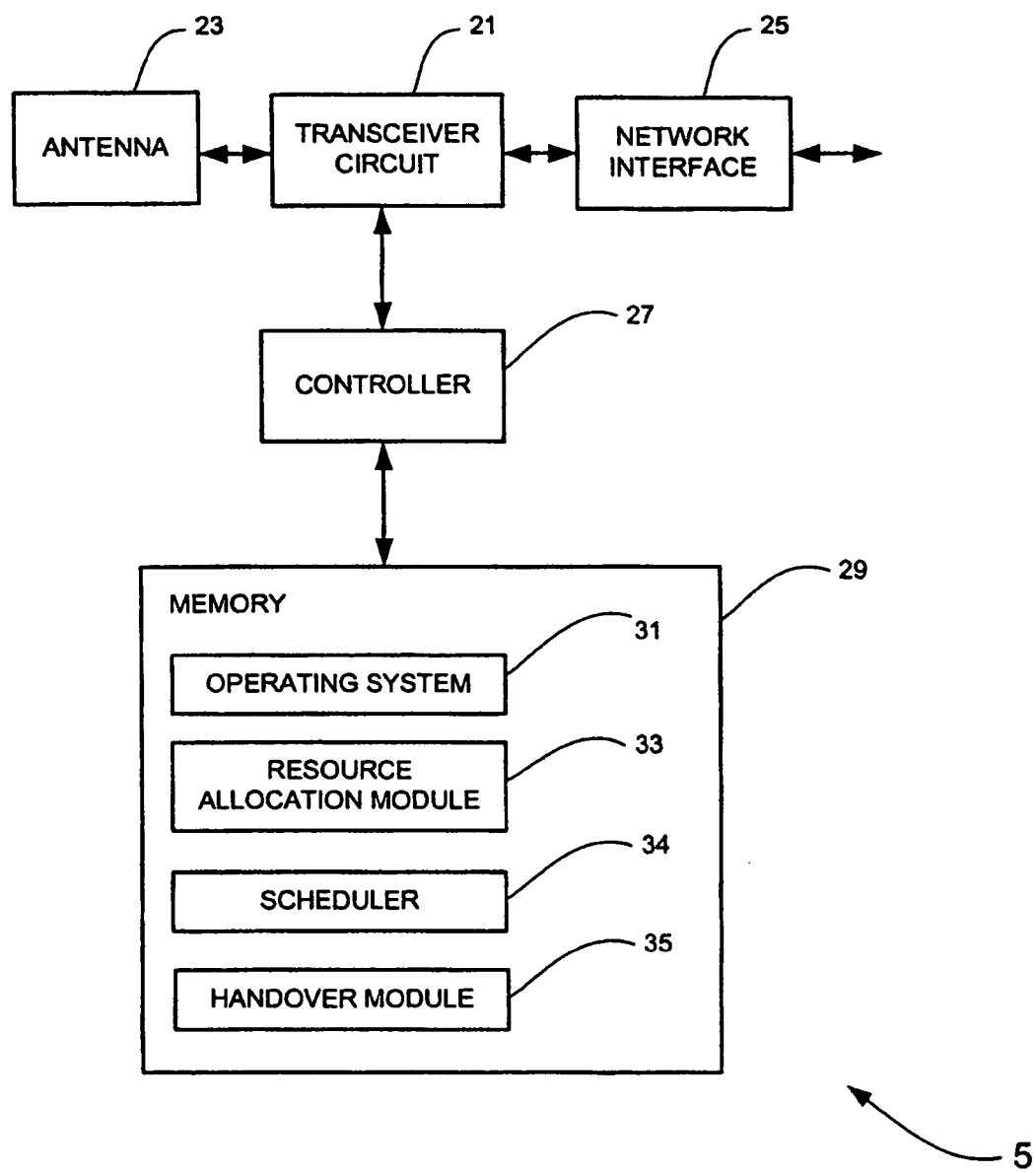
FIG. 2 schematically illustrates a base station forming part of the system shown in FIG. 1.

FIG. 2 is a block diagram illustrating the main components of each of the base stations 5 used in this embodiment. As shown, each base station 5 includes a transceiver circuit 21 which is operable to transmit signals to and to receive signals from the mobile telephones 3 via one or more antennae 23 (using the above described sub-carriers) and which is operable to transmit signals to and to receive signals from the telephone network 7 via a network interface 25. A controller 27 controls the operation of the transceiver circuit 21 in accordance with software stored in memory 29. The software includes, among other things, an operating system 31, a resource allocation module 33, and a scheduler 34. The resource allocation module 33 is operable to allocate the above described communications resources for the uplink and downlink communications to each mobile telephone 3 and the scheduler 34 schedules the transmission of downlink data to each mobile telephone 3 and the uplink transmission opportunities for each mobile telephone 5 based on the allocated resources. The software also includes a handover module 35, the operation of which will be described below.

Mobile Telephone

Figure 3:
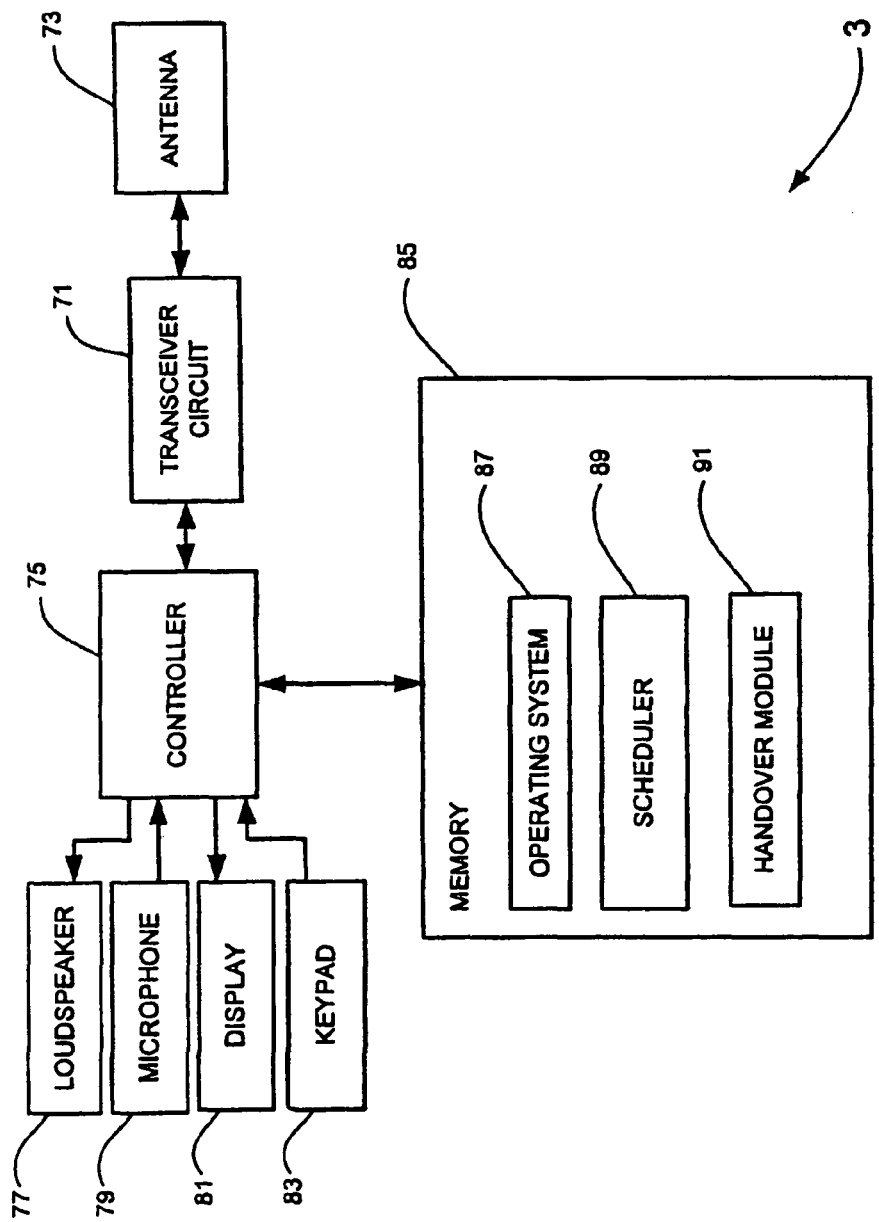
FIG. 3 schematically illustrates a mobile communication device forming part of the system shown in FIG. 1.

FIG. 3 schematically illustrates the main components of each of the mobile telephones 3 shown in FIG. 1. As shown, each of the mobile telephones 3 includes a transceiver circuit 71 that is operable to transmit signals to and to receive signals from the base station 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87, a scheduler 89, and a handover module 91. The scheduler 89 is responsible for scheduling the transmission of uplink data and the reception of downlink data in accordance with the resources allocated to the mobile telephone 3 for its communications with the base station 5; and the handover module 91 is responsible for controlling the handover (HO) process, described in more detail below.

In the above description, both the base station 5 and the mobile telephones 3 are described, for ease of understanding, as having respective discrete schedulers, resource allocation modules and handover modules. Whilst these software modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Protocols

Figure 4:
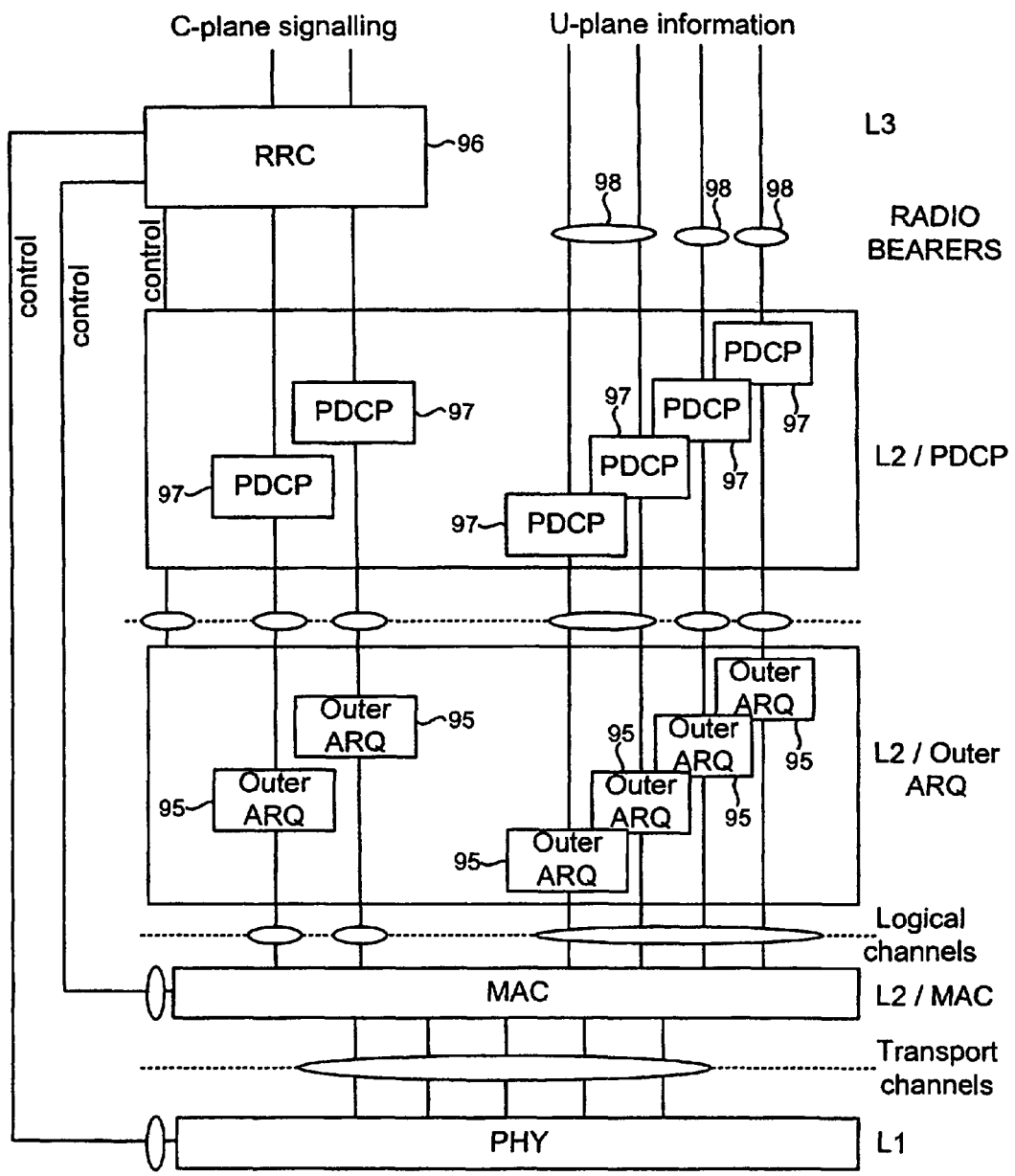
FIG. 4 illustrates three layers of a protocol stack used in the mobile communication device and the base station shown in FIG. 1.

FIG. 4 illustrates part of a protocol stack (lower three layers) used in the mobile telephones 3 and the base stations 5. The first layer is the physical layer (L1) which is responsible for the actual transmission of the data over the radio communication channel. Above that, present is the second layer (L2), which is divided into three sub-layers—the Medium Access Control layer (L2/MAC) which is responsible for controlling access to the air interface; the Outer ARQ (Automatic Repeat request) layer (L2/OARQ) which is responsible for concatenation and segmentation of data packets, the acknowledgment of packets and the re-transmission of data packets where necessary; and the Packet Data Convergence Protocol (PDCP) layer (L2/PDCP) which is responsible for header compression and ciphering. Above the second layer, present is the Radio Resource Control (RRC) layer (L3/RRC) that is responsible for controlling radio resources used in the air interface between the base station 5 and the mobile telephone 3. As shown, the L2/Outer ARQ layer includes a number of Outer ARQ entities 95 used to manage the transmission of C-plane data and U-plane data and the L2/PDCP layer includes PDCP entities 97 used to process the C-plane and the U-plane data.

FIG. 4 also shows the radio bearers 98 assigned to each source of data to be transmitted. Several software applications may be operating at the same time and each application may be sending and/or receiving data. A respective radio bearer is associated with each task and some radio bearers are assigned higher priority than others. For example, radio bearers assigned to real time services will be assigned higher priority than those assigned to non-real time services. The communication resources allocated by the base station 5 for the uplink are shared between the radio bearers 98, depending on their assigned priorities and data rates. The RRC layer 96 sets the data rate and priority for each radio bearer 98. The scheduler 89 then controls the scheduling of the data packets of each radio bearer 98 for transmission based on the data rates and priorities assigned to the radio bearers by the RRC layer 96.

Resource Allocation for Persistently Allocated Bearers

Resources may be allocated either dynamically (when needed) or in advance. Resources are dynamically allocated for activities such as web browsing, where the instantaneous data rate varies considerably. However, for other applications such as VoIP or streaming, the amount of resources that will be needed is known in advance and so resources can be "persistently" allocated for such activities, whereby initially allocated resources are provided on a regular basis without additional signalling. However, such persistently allocated resources have to be reallocated when the mobile telephone 3 moves from cell to cell or from one base station 5 to another in accordance with the defined "handover" procedure for the network.

Considering the case of a VoIP call, persistently allocated resources for the first transmission of the VoIP call will be signalled through RRC signalling at the time of call setup. Thereafter the schedulers 34 and 89 in the mobile telephone 3 and in the base station 5 will use the same resources at periodic times thereafter (e.g. every 20 ms). Now if the mobile telephone 3 needs to be handed over to a new cell or base station (e.g. from source base station 5-1 to target base station 5-2), new persistent resources for the VoIP call have to be allocated in the target base station 5-2 and signalled to the mobile telephone 3. This raises the questions of how and when the allocated resources should be signalled to the mobile telephone 3.

Two options exist for signalling persistently scheduled resources to the mobile telephone 3:

1. Resources for persistently scheduled bearers are signalled form the target base station 5-2 via the source base station 5-1 to the mobile telephone 3 during the handover procedure.
2. Resources for persistently scheduled bearers are signalled from the target base station 5-2 to the mobile telephone 3 after it has appeared in the target cell.

In the first option, the target base station 5-2 can allocate resources and signal them, in an RRC transparent container back to the source base station 5-1 in the HANDOVER REQUEST ACKNOWLEDGE message that will be sent to the mobile telephone 3 as part of the Handover Command Message. A transparent container is well known to those skilled in the art and essentially comprises a packet of data that can simply be forwarded by the source base station 5-1 towards the mobile telephone 3 without changing its content, and does not need further description here. The target base station 5-2 can reasonably calculate the starting time for these resources in the time domain and provide it as a part of the transparent container, such as in terms of a System Frame Number. Alternatively, the target base station 5-2 and the mobile telephone may assume that the reserved resources can be used immediately after the HO (HANDOVER) procedure is completed (or at some defined time point thereafter).

In the second option, the mobile telephone 3 sends a HANDOVER CONFIRM message to the target base station 5-2 to indicate that the handover procedure is completed for the mobile telephone 3. Thereafter, the target base station 5-2 will subsequently signal allocated resources for the persistently scheduled bearer and will indicate them to the mobile telephone 3 using the RRC CONNECTION CHANGE COMMAND.

One could argue that signalling the resource allocation for persistently scheduled bearers in the HO Command message using option 1 would significantly increase the size of the HO Command message which could increase HO failure rate. But, the inventor believes that the additional bits needed would only be around 50 bits, as will be described in more detail below.

As those skilled in the art will appreciate, the handover procedure described above can be used for inter base station 5 handover scenarios as well as intra base station handovers, as far as the allocation of persistently scheduled bearers is concerned.

Handover Procedure

A detailed description will now be given of the operation of the handover modules 35 and 91 in accordance with option 1 described above. The following description will use the nomenclature used in the Long Term Evolution (LTE) of UTRAN. Therefore, the mobile telephone 3 that is changing base stations 5 will be referred to as a UE, the source base station 5-1 will be referred to as the source eNodeB and the target base station 5-2 will be referred to as the target eNodeB.

Figure 5:
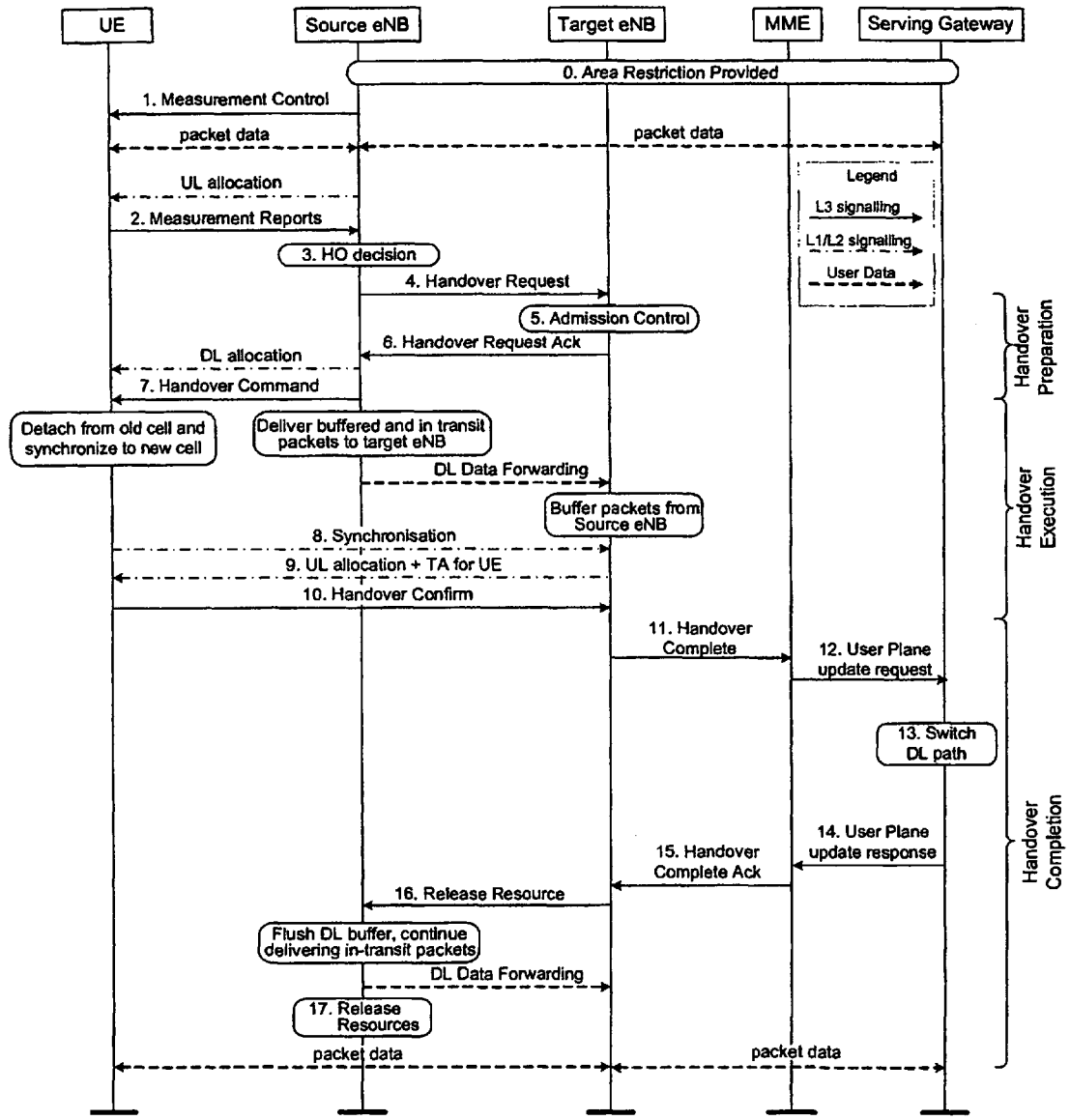
FIG. 5 shows a modified handover process according to one embodiment.

FIG. 5 illustrates the proposed intra-MME (Mobility Management Entity)/Serving Gateway Handover (HO) procedure:

0 The UE context within the source eNodeB contains information regarding roaming restrictions which were provided either at connection establishment or at the last TA update.

1 The source eNodeB configures the UE measurement procedures according to the area restriction information. Measurements provided by the source eNodeB may assist the function controlling the UE's connection mobility.

2 UE is triggered to send MEASUREMENT REPORT by the set rules i.e. system information, specification etc.

3 Source eNodeB makes decision based on MEASUREMENT REPORT and RRM information to hand off UE.

4 The source eNodeB issues a HANDOVER REQUEST message to the target eNodeB passing necessary information to prepare the HO at the target side (UE X2 signalling context reference at source eNodeB, UE EPC (Evolved Packet Core) signalling context reference, target cell ID, RRC context including the C-RNTI of the UE in the source eNodeB, AS-configuration (excluding physical layer configuration), SAE bearer context and physical layer ID of the source cell+MAC for possible RLF recovery). UE X2/UE S1 signalling references enable the target eNodeB to address the source eNodeB and the EPC. The SAE bearer context includes necessary RNL and TNL addressing information. It is for further study if the SAE bearer context includes the QoS profiles of the SAE bearers.

5 Admission Control may be performed by the target eNodeB dependent on the received SAE bearer QoS information to increase the likelihood of a successful HO, if the resources can be granted by target eNodeB. The target eNodeB configures the required resources according to the received SAE bearer QoS information and reserves a C-RNTI and optionally a RACH preamble. The AS-configuration to be used in the target cell can either be specified independently (i.e. an "establishment") or as a delta compared to the AS-configuration used in the source cell (ie. a "reconfiguration").

6 Target eNodeB prepares HO with L1/L2 and sends the HANDOVER REQUEST ACKNOWLEDGE to the source eNodeB. The HANDOVER REQUEST ACKNOWLEDGE message includes a transparent container to be sent to the UE as part of the Handover Command. The container may include a new C-RNTI, a dedicated RACH preamble, indication of resources for persistently scheduled bearers and possibly some other parameters i.e. access parameters, SIBs, etc. The HANDOVER REQUEST ACKNOWLEDGE message may also include RNL/TNL information for the forwarding tunnels, if necessary.

NOTE: As soon as the source eNodeB receives the HANDOVER REQUEST ACKNOWLEDGE, or as soon as the transmission of the handover command is initiated in the downlink, data forwarding may be initiated.

Steps 7 to 15 provide means to avoid data loss during HO and are further detailed in 10.1.2.1.2 and 10.1.2.3 of the 3GPP Specifications 36.300 EUTRAN Overall Description Stage 2.

7 The source eNodeB generates and sends the HANDOVER COMMAND (RRC message) towards the UE. The HANDOVER COMMAND includes the transparent container, which has been received from the target eNodeB. The source eNodeB performs the necessary integrity protection and ciphering of the message. The UE receives the HAN- DOVER COMMAND with necessary parameters (i.e. new C-RNTI, dedicated RACH preamble, possible starting time, target eNodeB SIBs etc) and is commanded by the source eNodeB to perform the HO.

8 After expiry of the starting time, if it is provided in the HANDOVER COMMAND, or otherwise after receiving the HANDOVER COMMAND, the UE performs synchronisation with the target eNodeB and accesses the target cell via RACH following a contention-free procedure if a dedicated RACH preamble was allocated in the HANDOVER COMMAND or following a contention-based procedure if no dedicated preamble was allocated.

9 Network responds with UL allocation and timing advance (to allow the UE to confirm the HO with the target eNodeB).

10 When the UE has successfully accessed the target cell, the UE sends the HANDOVER CONFIRM message (C-RNTI) to the target eNodeB to indicate that the handover procedure is completed for the UE. The target eNodeB verifies the C-RNTI sent in the HANDOVER CONFIRM message. The target eNodeB can now begin sending data to the UE. Based on further optimizations, the downlink data transmission can begin as early as after step 8.

11 The target eNodeB sends a HANDOVER COMPLETE message to MME to inform that the UE has changed cell.

12 The MME sends a USER PLANE UPDATE REQUEST message to the Serving Gateway.

13 The Serving Gateway switches the downlink data path to the target side and can release any U-plane/TNL resources towards the source eNodeB.

14 Serving Gateway sends a USER PLANE UPDATE RESPONSE message to MME.

15 The MME confirms the HANDOVER COMPLETE message with the HANDOVER COMPLETE ACK message.

16 By sending RELEASE RESOURCE the target eNodeB informs success of HO to source eNodeB and triggers the release of resources. The timing for the target eNodeB to send this message between steps 10 and 15 is for further study.

17 Upon reception of the RELEASE RESOURCE message, the source eNodeB can release radio and C-plane related resources associated to the UE context.

Signalling of Persistently Allocated Resources

For persistently scheduled bearers eNodeB shall allocate resources for the first transmissions via RRC Signalling. These resources shall be allocated during the call setup and during HO in the target cell. The following table proposes a way of optimising the parameters to be signalled between the UE and the eNodeB, to allocate persistently allocated resources.

| | Bits | Comment |
|---|---|---|
| UL Information/ per RB (Resource Block) | | |
| RB assignment | $\lceil \log_2(N_{RB}^{UL}(N_{RB}^{UL}+1)/2) \rceil$ 13 bits (Max) | Indicates the resource blocks the UE shall transmit upon for the first transmissions. Number of bits depends on the resource indication scheme selected by RAN 1. Indicated by Scheduler to RRC. Here Tree based mapping is assumed. |
| Transport format Would include MCS | 6 bits | 6 bits may indicate a unique combination of Payload size, modulation and coding schemes. 64 QAM may not be needed. QPSK and 16 QAM may be enough. |
| Frequency hopping information | 1 bit | Frequency Hopping ON/OFF. |
| CQI indication | 1 bit | Indicates whether or not a CQI report is transmitted. |
| Power Control Info | 2 bits | May not be needed. |
| Cyclic Shift for Demodulation Reference Signal format (DMRS) | 3 bits | Needed only for MU MIMO |
| DL Information/ per RB | | |
| RB assignment | $\lceil \log_2(N_{RB}^{UL}(N_{RB}^{UL}+1)/2) \rceil$ 13 bits (Max) | Number of bits depends on the resource indication scheme selected by RAN 1. Tree based mapping assumed. |
| Distributed Transmission | 1 bit | To indicate if it is localised or distributed transmission. |
| Transport format | 4-7 bits | No of bits needed may not be as high as 7. |
| TX diversity | 2 bits | Whether 2 or 4 antenna or none is used. |

-continued

| | Bits | Comment |
|---|---|---|
| Hybrid ARQ process number Information Common for UL and DL | 3 bits | HARQ Process information to be used throughout the duration of the call. |
| Duration | 0 bits | Infinite: Till the call is released or a reconfiguration of resource is done. |
| Starting Time | 8 bits | Could be indicted in terms of SFN. Last byte could be used to signal the starting time. |
| Interval | 2 bits | VoIP: 20 ms<br>Streaming: 10 ms, 20 ms<br>Signaling (Periodic Measurement Reports): Interval Configured by eNodeB |

Note: Ideally the Starting Time and the Interval should be identical for both UL and DL so that the UE can sleep if it correctly receives the first transmission. The table above indicates that a maximum of 62 bits are required for allocating resources to persistently scheduled bearers. However, the inventor believes that further reduction in the number of bits can be achieved and that only about 50 bits will be required to signal resource allocation information for persistently scheduled bearers which could also be easily included in a HO command message.

Modifications and Alternatives

A detailed embodiment has been described above. As those skilled in the art will appreciate, a number of modifications and alternatives can be made to the above embodiment whilst still benefiting from the inventions embodied therein. By way of illustration only a number of these alternatives and modifications will now be described.

In the above embodiment, a mobile telephone based telecommunications system was described. As those skilled in the art will appreciate, the signalling and handover techniques described in the present application can be employed in any communications system. In particular, many of these handover techniques can be used in wire or wireless based communications systems which either use electromagnetic signals or acoustic signals to carry the data. In the general case, the base stations and the mobile telephones can be considered as communications nodes or devices which communicate with each other. In intra eNodeB handover, the source and target communications nodes will be formed by respective scheduling entities within one base station. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Glossary of 3GPP Terms
LTE—Long Term Evolution (of UTRAN)
eNodeB—E-UTRAN Node B
UE—User Equipment—mobile communication device
DL—downlink—link from base to mobile
UL—uplink—link from mobile to base
MME—Mobility Management Entity
UPE—User Plane Entity
HO—Handover
RLC—Radio Link Control
RRC—Radio Resource Control
RRM—Radio Resource Management
SAE—System Architecture Evolution
C-RNTI—Cell-Radio Network Temporary Identifier
SIB—System Information Block
U-plane—User Plane
X2 Interface—Interface between two eNodeB
S1 Interface—Interface between eNodeB and MME
TA—Tracking Area
EPC—Evolved Packet Core
AS—Access Stratum
RNL—Radio Network Layer
TNL—Transport Network Layer
RACH—Random Access Channel
MU MIMO—Multi-User Multi Input Multi Output
DMRS—Demodulation Reference Signal Format
MCS—Modulation and Coding Scheme The following is a detailed description of the way in which the present invention may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

In this contribution we address the issue of how the resources for the persistently scheduled bearers are signalled during handover. In general we believe that the target eNB can allocate resources for persistently allocated bearers during HO preparation phase to avoid any additional RRC signalling after the HO in the target cell.

Discussion

Let's consider the case where we have just VoIP call ongoing for a UE. Persistently allocated resources for the first transmission of the VoIP call will have to be signalled through RRC signalling. Now if the UE needs to be handed over to a new cell, persistent resources for VoIP call would have to be allocated in the target cell and signalled to the UE. How and when the allocated resources are signalled to UE has not been discussed.

Two options exist for signalling persistently scheduled resources to the UE.

3. Resources for persistently scheduled bearers are signalled form the target eNB via the source to the UE 4. Resources for persistently scheduled bearers are signalled from the target to the UE after the it has appeared in the target Cell.

In this contribution we compare these two options and present our views on the UUDL resource allocation for persistently scheduled bearers in the target cell.

In the first option, the target eNB can allocate resource and signal it back in a RRC transparent container back to the source eNB in HANDOVER REQUEST ACKNOWLEDGE message to be sent to the UE as part of the Handover Command Message. We believe that the target eNB can reasonably calculate the starting time of these resources in time domain and provide it as a part of the transparent container as in terms of System Frame Number or alternatively the reserved resources can be implicitly be taken into use by the target eNB and UE immediately after the HO procedure is completed.

In the second option, after the UE sends a HANDOVER CONFIRM message to the target eNB to indicate that the handover procedure is completed for the UE. The target eNB will subsequently signal allocated resources for persistently scheduled bearer and indicate it to the UE using CONNECTION CHANGE COMMAND.

One could argue that signalling the resource allocation for persistently scheduled bearers in the HO Command message using option 1 would make the HO Command message significantly large which could increase HO failure rate, we feel that the additional bits needed would around 50 bits [1].

We think that additional RRC procedure for signalling resource allocation for persistently scheduled bearers during HO as described in option 2 is not elegant from signalling point of view. We propose RAN 2 to adopt option 1 and capture it in Stage 2 specifications.

Although the handover procedure described above is for inter eNB hand over scenarios, it is equally applicable for the intra eNB handover as far as the resource allocation persistently scheduled bearers is concerned.

Conclusion

In this paper we have discussed the issue of how the resources for the persistently scheduled bearers are allocated in the target cell during handover. We feel that it is more efficient to signal allocated resource for the persistently scheduled bearers in the target cell during HO preparation phase and indicate it to the UE in the HO Command message. We request RAN 2 to agree to this and capture it in the Stage 2 as described in the text proposal below.

Text Proposal

The HO procedure is performed without EPC involvement, i.e. preparation messages are directly exchanged between the eNBs. The release of the resources at the source side during the HO completion phase is triggered by the eNB. FIG. 5 below depicts the basic handover scenario where neither MME (Mobility Management Entity) nor Serving Gateway changes.

Below is a more detailed description of the intra-MME/Serving Gateway HO procedure:

0 The UE context within the source eNB contains information regarding roaming restrictions which where provided either at connection establishment or at the last TA (Tracking Area) update.

1 The source eNB configures the UE measurement procedures according to the area restriction information. Measurements provided by the source eNB may assist the function controlling the UE's connection mobility.

2 UE is triggered to send MEASUREMENT REPORT by the rules set by i.e. system information, specification etc.

3 Source eNB makes decision based on MEASUREMENT REPORT and RRM information to hand off UE.

4 The source eNB issues a HANDOVER REQUEST message to the target eNB passing necessary information to prepare the HO at the target side (UE X2 signalling context reference at source eNB, UE S1 EPC signalling context reference, target cell ID, RRC context including the C-RNTI of the UE in the source eNB, AS-configuration (excluding physical layer configuration), SAE bearer context and physical layer ID of the source cell+MAC for possible RLF recovery). UE X2/UE S1 signalling references enable the target eNB to address the source eNB and the EPC. The SAE bearer context includes necessary RNL and TNL addressing information. It is FFS if the SAE bearer context includes theQoS profiles of the SAE bearers.

5 Admission Control may be performed by the target eNB dependent on the received SAE bearer QoS information to increase the likelihood of a successful HO, if the resources can be granted by target eNB. The target eNB configures the required resources according to the received SAE bearer QoS information and reserves a C-RNTI and optionally a RACH preamble. The AS-configuration to be used in the target cell can either be specified independently (i.e. an "establishment") or as a delta compared to the AS-configuration used in the source cell (ie. A "reconfiguration").

6 Target eNB prepares HO with L1/L2 and sends the HANDOVER REQUEST ACKNOWLEDGE to the source eNB. The HANDOVER REQUEST ACKNOWLEDGE message includes a transparent container to be sent to the UE as part of the Handover Command. The container may include a new C-RNTI, a dedicated RACH preamble, indication of resources for persistently scheduled bearers and possibly some other parameters i.e. access parameters, SIBS, etc. The HANDOVER REQUEST ACKNOWLEDGE message may also include RNL/TNL information for the forwarding tunnels, if necessary. NOTE: As soon as the source eNB receives the HANDOVER REQUEST ACKNOWLEDGE, or as soon as the transmission of the handover command is initiated in the downlink, data forwarding may be initiated.

Steps 7 to 15 provide means to avoid data loss during HO and are further detailed in 10.1.2.1.2 and 10.1.2.3.

7 The source eNB generates the HANDOVER COMMAND (RRC message) towards the UE. The HANDOVER COMMAND includes the transparent container, which has been received from the target eNB. The source eNodeB performs the necessary integrity protection and ciphering of the message. The UE receives the HANDOVER COMMAND with necessary parameters (i.e. new C-RNTI, dedicated RACH preamble, possible starting time, target eNB SIBs etc) and is commanded by the source eNB to perform the HO.

8 After expiry of starting time if provided in HAN DOVER COMMAND or after receiving the HANDOVER COMMAND otherwise, UE performs synchronisation to target eNB and accesses the target cell via RACH following a contention-free procedure if a dedicated RACH preamble was allocated in HANDOVER COMMAND or following a contention-based procedure if no dedicated preamble was allocated.

9 Network responds with UL allocation and timing advance.

10 When the UE has successfully accessed the target cell, the UE sends the HANDOVER CONFIRM message (C-RNTI) to the target eNB to indicate that the handover procedure is completed for the UE. The target eNB verifies the C-RNTI sent in the HANDOVER CONFIRM message. The target eNB can now begin sending data to the UE. Based on further optimizations, the downlink data transmission can begin as early as after step 8 (FFS).

11 The target eNB sends a HANDOVER COMPLETE message to MME to inform that the UE has changed cell.

12 The MME sends a USER PLANE UPDATE REQUEST message to the Serving Gateway.

13 The Serving Gateway switches the downlink data path to the target side and can release any U-plane/TNL resources towards the source eNB.

14 Serving Gateway sends a USER PLANE UPDATE RESPONSE message to MME.

15 The MME confirms the HANDOVER COMPLETE message with the HANDOVER COMPLETE ACK message.

16 By sending RELEASE RESOURCE the target eNB informs success of HO to source eNB and triggers the release of resources. The timing for the target eNB to send this message between steps 10 and 15 is FFS.

17 Upon reception of the RELEASE RESOURCE message, the source eNB can release radio and C-plane related resources associated to the UE context.

NOTE: Details on updating of roaming/area restriction information within E-UTRAN in the course of the HO procedure are FFS References

[1] R2-075001: Information in RRC Messages for Persistantly Schedulded Bearers, NEC Introduction In this contribution we have first look necessary information that is needed for signalling the resources for the persistently scheduled bearers that are allocated for the first transmissions with RRC Signalling during call setup. This information can be also included as parts of RRC transparent container in the HANDOVER REQUEST ACKNOWLEDGE message if we decide to allocate the resources in the target cell during inter eNB HO and signal it in the RRC HO Command message.

Discussion

For persistently scheduled bearers eNB shall allocate resources for the first transmissions via RRC Signalling. These resources shall be allocated during the call establishment and during HO in the target cell. The parameters for the signalling the resources are given in Table 1 below. The parameters used for the dynamic allocation of resources as listed in [1] have been optimised for indicating the resource allocation for the first transmissions of persistently scheduled bearers using RRC signalling.

| | Bits | Comment |
|---|---|---|
| UL Information/ per RB | | |
| RB assignment | $\lceil \log_2(N_{RB}^{UL}(N_{RB}^{UL}+1)/2) \rceil$ 13 bits (Max) | Indicates the resource blocks the UE shall transmit upon for the first transmissions. Number of bits depends on the resource indication scheme selected by RAN 1. Indicated by Scheduler to RRC. Here Tree based Mapping is assumed. |
| Transport format | 6 | 6 bits may indicate a unique combination of Payload size, modulation and coding schemes. 64 QAM may not be needed. QPSK and 16 QAM may be enough. |
| Frequency hopping information | 1 | Frequency Hopping ON/OFF. |
| CQI Indication | 1 | Indicates whether or not CQI report is transmitted |
| Power Control Info | 2 bits | To control the value of UL |
| Cyclic Shift for Demodulation Reference Signal Format (DMRS) | 3 bits | Needed only MU MIMO |
| DL Information/ per RB | | |
| RB assignment | $\lceil \log_2(N_{RB}^{UL}(N_{RB}^{UL}+1)/2) \rceil$ 13 bits (Max) | Number of bits depends on the resource indication scheme selected by RAN 1. Tree based mapping is assumed. |
| Distributed Transmission | 1 | 1 bit indication to indicate whether a it's a localized or distributed transmission. |
| Transport format | 4-7 | No of bits needed may not be as high as 7. |
| TX diversity | 2 bits | Whether 2 or 4 antenna or none is used. |
| Hybrid ARQ process number | 3 | HARQ Process information to be used throughout the duration of the call. |
| Information Common for UL and DL | | |
| Duration | 0 bits | Infinite: Till the call is released or a reconfiguration of resource is done. |
| Starting Time | 8 bits | Could be indicted in terms of SFN. Last byte could be used to signal the starting time. |

-continued

| Bits | Comment |
|---|---|
| Interval | 2 bits | VoIP: 20 ms<br>Streaming: 10 ms, 20 ms<br>Signaling (Periodic Measurement Reports):<br>Interval Configured by eNB |

Note:
Ideally the Starting time and the interval should be identical for both UL and DL so that UE can sleep if it correctly receives the first transmission. Initial analysis shows that there are total around 50 bits needed to signal resource allocated information for persistently scheduled bearers which could also be easily be included in HO command message.

Conclusion

In this contribution we have a first look at the parameters that would be required in RRC message for signalling the resource allocation for the persistently allocated bearers. These parameters could also be used in the target eNB to Source eNB transparent container to signal the resource allocated in the target cell for persistently scheduled bearers.

It is proposed that RAN 2 discusses these parameters and agrees to include it in the RRC specs 36.331.

This application is based upon and claims the benefit of priority from United Kingdom Patent Application No. 0721148.5, filed on Oct. 29, 2007, the disclosure of which is incorporated herein in its entirety by reference.

The invention claimed is:

1. A method performed in a target communications device, the method comprising:
receiving a handover request from a source communications device indicating handover of a user communications device from the source communications device to the target communications device;
judging whether required resources are to be persistently allocated or to be dynamically allocated for communication with the user communications device;
determining the required resources to be persistently allocated for communication with the user communication device;
preparing a handover request acknowledgment including allocation data that includes new persistently allocated resources identifying resources to be persistently allocated for the user communications device; and
sending the handover request acknowledgment to the source communications device,
wherein the allocation data comprises data indicating a start time from which the allocated resources are to be used, and
wherein said data indicating the start time comprises a system frame number.

2. A method according to claim 1, further comprising: using the new persistently allocated resources to communicate with the user device.

3. A method according to claim 1, wherein the allocation data is provided within a transparent container that is included within the handover request acknowledgment.

4. A method according to claim 1, wherein the allocation data comprises data identifying the resource blocks to use for communications.

5. A method according to claim 1, wherein the allocation data comprises data indicating an interval between successive times that the allocated resources are to be used.

6. A method according to claim 1, wherein said allocation data comprises:
i) uplink allocation data defining resources to be used by the user communications device to transmit data to the target communications device;
ii) downlink allocation data defining resources to be used by the user communications device to receive data from the target communications device; and
iii) common data relating to information that is common for uplink and downlink communications.

7. A method according to claim 6, wherein said common data comprises data indicating a start time from which the allocated resources can be used.

8. A method according to claim 6, wherein said common data comprises data indicating an interval between successive times that the allocated resources are to be used.

9. A method performed in a source communications device, the method comprising:
performing communication with a user communication device by using persistently allocated resources;
transmitting, to a target communications device, a handover request indicating handover of the user communications device from the source communications device to the target communications device;
receiving, from the target communications device, a handover request acknowledgment including allocation data identifying new resources to be persistently allocated for the user communications device to communicate with the target communications device;
preparing a handover command including said allocation data identifying said new persistently allocated resources; and
sending the handover command to the user communications device,
wherein the allocation data comprises data indicating a start time from which the allocated resources are to be used, and
wherein said data indicating the start time comprises a system frame number.

10. A method according to claim 9, wherein the allocation data is received within a transparent container that is included within the handover request acknowledgment.

11. A method according to claim 10, wherein the preparing of said handover command includes:
including said transparent container within the handover command.

12. A method performed in a user communications device, the method comprising:
communicating with a source communications device using first persistently allocated resources;
receiving a handover command from the source communications device, the handover command instructing the user communications device to handover to a target communications device and including second persistently allocated resources allocated by the target communications device as second persistently allocated data; and
processing the received handover command to determine the persistently allocated resources to be used to communicate with said target communications device, wherein the second persistently allocated resources are allocated to the user communication device instead of the first persistently allocated resources when the second persistently allocated resources are determined as the persistently allocated resources, wherein the second persistently allocated data comprises data indicating a start time from which the allocated resources are to be used, and wherein said data indicating the start time comprises a system frame number.

13. A method according to claim 12, further comprising:
using the second persistently allocated resources to communicate with the target communications device.

14. A method according to claim 12, wherein the second persistently allocated data is provided within a transparent container that is included within the handover command.

15. A method according to claim 12, wherein the second persistently allocated data comprises data identifying the resource blocks to use for communications.

16. A method according to claim 12, wherein the second persistently allocated data comprises data indicating an interval between successive times that the allocated resources are to be used.

17. A method according to claim 12, wherein said second persistently allocated data comprises:
 i) uplink allocation data defining resources to be used by the user communications device to transmit data to the target communications device;
 ii) downlink allocation data defining resources to be used by the user communications device to receive data from the target communications device; and
 iii) common data relating to information that is common for uplink and downlink communications.

18. A method according to claim 17, wherein said common data comprises data indicating a start time from which the allocated resources can be used and wherein:
the method comprises using the start time to control when an initial communication with said target communications device is made.

19. A method according to claim 17, wherein said common data comprises data indicating an interval between successive times that the allocated resources are to be used and further comprising:
using the interval data to control times when said user device uses said second persistently allocated resources to communicate with said target communications device.

20. A target communications device, comprising:
means for receiving a handover request from a source communications device indicating handover of a user communications device from the source communications device to the target communications device;
means for judging whether required resources are to be persistently allocated or to be dynamically allocated for communication with the user communications device;
means for determining the required resources to be persistently allocated for communication with the user communications device;
means for preparing a handover request acknowledgment including allocation data that includes new persistently allocated resources identifying resources to be persistently allocated for the user communications device; and
means for sending the handover request acknowledgment to the source communications device,
wherein said preparing means is operable to prepare allocation data comprising data indicating a start time from which the allocated resources are to be used, and wherein said preparing means is operable to prepare data indicating the start time comprising a system frame number.

21. A device according to claim 20, further comprising means for using the persistently allocated resources to communicate with the user device.

22. A device according to claim 20, wherein the means for preparing is operable to provide said allocation data within a transparent container that is included within the handover request acknowledgment.

23. A device according to claim 20, wherein said preparing means is operable to prepare allocation data that comprises data identifying the resource blocks to use for communications.

24. A device according to claim 20, wherein said preparing means is operable to prepare allocation data comprising data indicating an interval between successive times that the allocated resources are to be used.

25. A device according to claim 20, wherein said preparing means is operable to prepare the allocation data that comprises:
 i) uplink allocation data defining resources to be used by the user communications device to transmit data to the target communications device;
 ii) downlink allocation data defining resources to be used by the user communications device to receive data from the target communications device; and
 iii) common data relating to information that is common for uplink and downlink communications.

26. A device according to claim 25, wherein said preparing means is operable to prepare common data including data indicating a start time from which the allocated resources can be used.

27. A device according to claim 25, wherein said preparing means is operable to prepare common data comprising data indicating an interval between successive times that the allocated resources are to be used.

28. A source communications device, comprising:
means for performing communication with a user communication device by using persistently allocated resources;
means for transmitting, to a target communications device, a handover request indicating handover of the user communications device from the source communications device to the target communications device;
means for receiving, from the target communications device, a handover request acknowledgment including allocation data identifying, as new persistently allocated resources, resources to be persistently allocated for the user communications device to communicate with the target communications device;
means for preparing a handover command including said allocation data identifying said new persistently allocated resources; and
means for sending the handover command to the user communications device,
wherein the allocation data comprises data indicating a start time from which the allocated resources are to be used, and
wherein said data indicating the start time comprises a system frame number.

29. A device according to claim 28, wherein the allocation data is received within a transparent container that is included within the handover request acknowledgment.

30. A device according to claim 29, wherein said means for preparing said handover command includes means for including said transparent container within the handover command.

31. A user communications device, comprising:
means for communicating with a source communications device using first persistently allocated resources;
means for receiving a handover command from the source communications device, the handover command instructing the user communications device to handover to a target communications device and including second persistently allocated resources allocated by the target communications device, as second persistently allocated data; and
means for processing the received handover command to determine the persistently allocated resources to be used to communicate with said target communications device,
wherein the second persistently allocated resources are allocated to the user communication device instead of the first persistently allocated resources when the second persistently allocated resources are determined as the persistently allocated resources,
wherein the receiving means is operable to receive said second persistently allocated data that comprises data indicating a start time from which the allocated resources are to be used, and
wherein said data indicating the start time comprises a system frame number.

32. A device according to claim 31, wherein said communicating means is operable to use the second persistently allocated resources to communicate with the target communications device.

33. A device according to claim 31, wherein the receiving means is operable to receive said second persistently allocated data within a transparent container that is included within the handover command.

34. A device according to claim 31, wherein the receiving means is operable to receive said second persistently allocated data that comprises data identifying the resource blocks to use for communications.

35. A device according to claim 31, wherein the receiving means is operable to receive the second persistently allocated data that comprises data indicating an interval between successive times that the allocated resources are to be used.

36. A device according to claim 31, wherein the receiving means is operable to receive the second persistently allocated data that comprises:
i) uplink allocation data defining resources to be used by the user communications device to transmit data to the target communications device;
ii) downlink allocation data defining resources to be used by the user communications device to receive data from the target communications device; and
iii) common data relating to information that is common for uplink and downlink communications.

37. A device according to claim 36, wherein said common data comprises data indicating a start time from which the allocated resources can be used and wherein the device comprises means for using the start time to control when an initial communication with said target communications device is made.

38. A device according to claim 36, wherein said common data comprises data indicating an interval between successive times that the allocated resources are to be used and further comprising means for using the interval data to control times when said user device uses said second persistently allocated resources to communicate with said target communications device.

39. A target communications device, comprising:
a receiver operable to receive a handover request from a source communications device indicating handover of a user communications device from the source communications device to the target communications device;
a processor operable to:
judge whether required resources are to be persistently allocated or to be dynamically allocated for communication with the user communications device;
determine the required resources to be persistently allocated for communication with the user communications device; and
prepare a handover request acknowledgment including allocation data that includes new persistent allocated resources identifying resources to be persistently allocated for the user communications device; and
a transmitter operable to send the handover request acknowledgment to the source communications device,
wherein the allocation data comprises data indicating a start time from which the allocated resources are to be used, and
wherein said data indicating the start time comprises a system frame number.

40. A source communications device, comprising:
a transmitter operable to perform communication with a user communication device by using persistently allocated resources and to transmit, to a target communications device, a handover request indicating handover of the user communications device from the source communications device to the target communications device;
a receiver operable to receive, from the target communications device, a handover request acknowledgment including allocation data identifying, as new persistently allocated resources, resources to be persistently allocated for the user communications device to communicate with the target communications device;
a processor operable to prepare a handover command including said allocation data identifying said new persistently allocated resources; and
wherein said transmitter is operable to transmit the handover command to the user communications device,
wherein the allocation data comprises data indicating a start time from which the allocated resources are to be used, and
wherein said data indicating the start time comprises a system frame number.

41. A user communications device, comprising:
a transceiver operable to communicate with a source communications device using first persistently allocated resources;
a processor operable: i) to receive a handover command from the source communications device, the handover command instructing the user communications device to handover to a target communications device and including second persistently allocated resources allocated by the target communications device, as second persistently allocated data; and ii) to process the received handover command to determine the persistently allocated resources to be used to communicate with said target communications device;
wherein the second persistently allocated resources are allocated to the user communication device instead of the first persistently allocated resources when the second persistently allocated resources are determined as the persistently allocated resources, wherein the allocation data comprises data indicating a start time from which the allocated resources are to be used, and wherein said data indicating the start time comprises a system frame number.

42. A method according to claim 9, wherein the allocation data comprises data indicating an interval between successive times that the allocated resources are to be used.

* * * * *